United States Patent Office 2,994,630
Patented Aug. 1, 1961

2,994,630
LEATHER REPLACEMENT
Robert O. Osborn, Snyder, N.Y., assignor to E. I. du Pont de Nemours and Company, Wilmington, Del., a corporation of Delaware
No Drawing. Filed May 17, 1957, Ser. No. 659,755
4 Claims. (Cl. 154—46)

This invention relates to sheet-like material which is useful as a leather substitute and particularly for use in making shoe uppers and the like where appearance, scuff-resistance, toughness, and comfort features such as flexibility, softness, and ability to breathe and to transpire water vapor are important. More particularly, it relates to sheet-like material consisting essentially of batts of non-woven fibers that have been compressed with, and the fibers of which are bound together by, extensible polymeric binder and further characterized by having a surface stratum in which the fiber is glass and a base stratum in which the fiber is organic.

Various sheet-like materials based on bound batts, or mats, of non-woven fibers have heretofore been suggested for use as leather substitutes. Such materials have generally had shortcomings when used in making shoe uppers because of their lack of the desirable balance of properties needed for such use. For example, scuff-resistance is a desirable property of a material to be used as a leather substitute in shoe uppers but the provision of adequate scuff-resistance heretofore has usually resulted in a sacrifice of one or more of such other essential properties as toughness, flexibility, and ability to transpire water vapor.

I have discovered a new sheet material structure based on bound non-woven fiber mats which not only possesses outstanding scuff-resistance but also a suitable balance of other properties necessary in a material to be used as a substitute or a replacement for leather in shoes. The leather substitute materials of my invention are made by plying as a surface stratum a mat of non-woven glass fibers, bound together with an extensible polymeric binder, with a base mat of non-woven organic fibers bound together with an extensible polymeric binder, followed by hot pressing of the plied mats to form a compacted structure, and subsequent stretching of the compacted structure. The stretching causes fibers to break away from the binder material and form a network of interconnecting pores thereby imparting breathability and water vapor permeability to the structure.

Non-woven glass fiber mats used in making the surface stratum are readily prepared by known methods such as the paper making techniques. In this, for example, the fibers are slurried or dispersed in water or other liquid and then filtered on to a screen to obtain a sheet of interlaced glass fibers. The glass fibers used are preferably fine, for example, from about 5 to 50 microns in diameter and more preferably from about 5 to 10 microns. Best results are obtained by forming the non-woven glass fiber mat of fibers of length not more than about ½ inch, and more preferably not more than about ¼ inch. Longer fibers tend to aggregate into string-like bundles which give an undesirable roughened surface to the glass fiber mat. Very short fibers down to as low as 0.01 inch in length can be used.

Having thus formed the mat of glass fibers, it is then brought together with an extensible polymeric material which serves to bind the fibers together. This step can be effected in any convenient manner. Thus, for example, the mat can be permeated with a solution or suspension of the binder. Conveniently, the binder material in the form of a plastisol is sprayed on to the glass mat. Preferably, the amount of extensible polymeric binder used is from 100% to 200% of the weight of the glass fiber.

A wide variety of organic fibers can be used in a non-woven mat of the base stratum employed in the compositions of the invention. Illustrative of suitable fibers are those made of the synthetic linear polyamides such as polyhexamethylene adipamide, polyhexamethylene sebacamide, polycaproamide and interpolyamides; and polyesters, and polyesteramides, and mixtures or blends thereof such as dibasic diamide or amino acid polyamides, dibasic dihydroxy acid/polyester; and the intermixed polyester/polyamide products described in U.S. Patents 2,071,250, 2.071,251, 2,071,253, 2,130,948, 2,224,037 and 2,572,833. Preferred are fibers made of linear condensation polymers. And most preferred are fibers of synthetic linear polyamides, nylon. Other fibers which can be used, preferably as mixtures with nylon or other synthetic linear condensation polymer are cotton, ramie, viscose rayon, acetate rayon, wool, polyacrylonitrile, acrylonitrile copolymers, polyurethanes, and polyvinyl acetals.

The denier and length of the fibers used in making the mats for the base stratum can be varied widely. Ordinarily, the length will be in the range of from about ½ to 3 inches. About 1.5 inches is preferred. The denier will ordinarily be within the range of from about 0.5 to 6 denier per filament. About 3 denier is preferred.

The base mats or batts of non-woven organic fibers for use in making the base layer of the compositions of the invention are readily prepared by known methods for laying down and interlacing fibers, such as the techniques used in wool carding and paper making. Preferably, the well known felt making technique is followed by superposing a plurality of single webs or slivers of fibers from a carding machine in parallel or crosslapped plies. Added strength can be imparted to the fiber mats by passing them thru a needle loom. Needle looming tends to orient some of the fibers in a direction generally perpendicular to the surfaces of the mat.

The operation of binding the non-woven mats of organic fibers with an extensible polymeric binder can be effected in any convenient manner. Thus, for example, the mat can be permeated with a solution or suspension of the binder. Alternatively, the binder can be spread on to or distributed throughout the mat in the form of finely divided particles. If the binder is of a kind that can be made in sheet or film form, such sheets or films can be laid in contact with the fiber mats. Also, if the binder is one that can be made in fiber form, fibers of the binder can be mixed with the fibers used to form the mat during the mat forming step. Still another method involves the use of structural or mat forming fibers that have been coated with the binder material prior to forming the mat.

The extensible polymeric binder used in binding the glass fibers of the surface stratum and the organic fibers of the base stratum can be any of a great variety of soft, elastic, initially thermoplastic (i.e., flows under the conditions of the subsequent hot pressing step), synthetic polymers which may be classified generally as elastomers. The binder material used for the glass fiber mat and the one used for the organic fiber mat can be the same or different but will ordinarily be the same. Care should be taken, however, to select a polymeric binder for the organic fibers that is chemically different from those fibers. A convenient rule is that the binder when softened or melted in the subsequent hot pressing step be incompatible with the organic fibers. Additionally, the binder selected should be relatively fusible with respect to the organic fiber, which, in terms of practical commercial operation, means that the differential in the temperature at which the organic fiber and the binder soften and develop adhesive properties is preferably not substantially less than about 50° F. In other words, the binder should flow at a temperature at least 50° F. below the deformation temperature of the organic fiber.

Among the extensible polymeric materials which can be used as binders in making the products of this invention are those classified as elastomers by H. L. Fisher in Industrial and Engineering Chemistry, August 1939, page 942.

In the most preferred products of this invention, the polymeric binder is a linear addition polymer. Because of their availability and particularly their low cost and desirable polymer properties, the most outstanding of these are the vinyl and vinylidene polymers including both the monoene and diene types. This class of polymers is characterized by having in each polymerizable monomer as the only polymerizable ethylenic unsaturation, terminal ethylenic groups wherein the terminal carbon is a methylene carbon, i.e., those containing one or more vinyl ($CH_2=CH-$) or vinylidene ($CH_2=C<$) groups. Specific examples of such polymers include the various hydrocarbon polymers such as butadiene/styrene, polyisobutylene, polyisoprene, both synthetic and natural; the various negatively substituted polymers such as the vinylidene halides and vinyl halide polymers, for example, polyvinylidene chloride, polyvinyl chloride and polyvinyl fluoride; derivatives of such polymers as halogenated vinyl and vinylidene polymers, e.g., chlorinated polyethylene, and chlorinated polyvinyl chloride; the various vinylidene polymers wherein one or both of the indicated free valences of the 2-carbon and of the vinylidene group are bonded to carboxyl groups, or groups hydrolyzable to carboxyl groups, either directly to the acyl carbon thereof (e.g., polymethyl acrylate) or to the oxy oxygen thereof (e.g., polyvinyl acetate); vinyl and vinylidene carboxylic acids and their derivatives such as acrylic acid, acrylonitrile, and methacrylamide.

Also included in the preferred group are various copolymers of such vinyl and vinylidene monomers, for example, 2,3 - dichlorobutadiene,1,3/2-chlorobutadiene-1,3, vinyl chloride/vinyl acetate, vinyl chloride/vinylidene chloride, ethylene/vinyl acetate, ethylene/vinyl chloride, and butadiene/acrylonitrile copolymers.

Various polyesters containing terephthalic acid or derivatives thereof as essential components are also useful as binder polymers. These include polyethylene terephthalate and copolyesters made from ethylene glycol terephthalic acid and sebacic acid of the general type described and claimed in U.S. Patents 2,623,031 and 2,623,033. Polyamides useful as a binder polymer include N-methoxymethyl polyhexamethylene adipamide and other similar polymers disclosed and claimed in U.S. Patent 2,430,860.

Also useful as binder polymers are the polyvinyl acetals, such as polyvinyl butyral, and polyvinyl laural.

Still other elastomeric polymers which can be employed as binders in the present invention are the polyurethanes which are essentially reaction products of (1) an organic polyisocyanate or polyisothiocyanate with (2) a compound obtainable by reacting (a) one or more polyhydric alcohols with (b) one or more polycarboxylic acids (either in the presence or absence of one or more monocarboxylic acids). Certain products of this type are described and claimed in U.S. Patent 2,333,639.

Other types of elastomeric polymers which can be used as binders include reaction products of polyalkylene ether glycols and organic diisocyanates, such as described in U.S. patent application S.N. 365,270, filed June 30, 1953, by F. B. Hill, Jr.

In many instances, it is desirable to have appreciable proportions of plasticizers for the binder polymers in the binder composition. This is particularly important in the case of the vinylidene resins. Plasticizers provide pliability in products that might otherwise be too stiff. This is particularly true of the higher molecular weight, negatively substituted vinylidene polymers and copolymers, such as the vinyl chloride/vinylidene chloride and vinyl chloride/vinyl acetate copolymers. Suitable examples of plasticizers include the mono- or dicarboxylic acid/alcohol or/polyolesters such as glycol dibenzoate, dioctyl sebacate, dioctyl phthalate, and polypropylene sebacate; or the polyesters of the lower polyalkylene oxides such as methoxypolyethylene glycol octoate.

The amount of binder used in binding the fibers of the non-woven organic fiber base mat in general amounts to from about 40 to 225% by weight of the organic fibers, and more preferably, from about 70 to 150% by weight of the organic fiber. Products made containing too low a quantity of polymer binder feel more like felt than leather and those containing too much binder are ordinarily stiff or brittle and hence undesirable.

Having formed a bound mat of non-woven glass fibers and a bound mat of non-woven organic fibers, as indicated above, the two mats are then plied by placing one on the other, and are compacted to a unitary structure by a hot pressing step, the fibers becoming substantially embedded in and bound by binder polymer.

In the hot pressing step, the temperature used can be varied as desired keeping in mind the requirement that it must be high enough to cause binder polymer to flow but not so high as to fuse or transpose the organic fibers of the base mat appreciably. This requirement also makes apparent the need, as indicated heretofore, in selecting the organic fiber and the binder to be used, to choose a fiber that is, with respect to the binder, relatively non-fusible. In terms of practical commercial operation, this means that the differential in the temperature at which the fiber and the binder soften and develop adhesive properties is preferably not substantially less than about 50° F. With most combinations of fiber and binder a temperature in the range of 100° to 250° C. will be satisfactory in the hot pressing step, and with the preferred combinations temperatures of 150°–200° C. are preferred.

The pressure used in the hot pressing step can be varied widely to give the degree of compacting required. Ordinarily, the pressure applied will be from 50 to 1500 pounds per square inch, the higher pressures, of course, giving a more dense, tougher structure. In the preferred embodiments, the base and surface mats are so prepared and compacted as to provide in the unitary structure a compacted base stratum having a thickness of from about 25 to 70 mils and a surface layer obtained from the bound glass fiber mat which is from about ⅓ to 1/20 the thickness of the base stratum.

The hot pressing step is ordinarily of short duration, in the order of 3 to 20 minutes depending upon the nature of the organic fiber and binder composition used, the temperature, and pressure, but other times can be used as may be desired with varied combinations of ingredients and processing conditions.

The hot pressing step can be carried out using conventional apparatus. For example, the material to be processed can be passed between heated calender rolls under pressure or pressed between heated plates.

The hot pressed compacted sheet material is processed, after cooling to about room temperature, by stretching to impart to it breathability and ability to transpire water vapor. This step is ordinarily carried out by stretching the material from 10 to 30% of its original dimension in one or more directions. This causes a substantial portion of the fibers in the sheet to break away from the binder polymer. The result is that a network of channels or pores are formed more or less contiguous with the fibers along a major portion of a substantial number of the fibers. Since the fibers in the sheet are tightly compacted, there results an inter-connecting of a substantial number of the channels or pores that are contiguous with adjacent or substantially touching or intersecting fibers. Porosity and water vapor permeability is thereby imparted. It is not necessary to maintain the stretching forces on the sheet material more than momentarily, then it is permitted to relax. Simril U.S. 2,757,100 describes such a method in detail.

The term "contiguous" as applied to the pores or channels in the sheet material refers to channels or pores adjacent to portions of fibers throughout the structure. The channels are not necessarily completely annular. In some cases, the channels may spiral around part of the length of the fiber or may take the form of a hairline crack substantially parallel to or immediately adjacent to the fiber. They are formed by breaking away fibers from the binder, and this breaking away occurs especially at points where fibers cross or otherwise contact each other. In general, such pores, channels, or cracks form a capillary network.

It should be noted that color can be imparted to the sheet material of this invention, if desired, by incorporating dyes or pigments into the binder used for the fibers or alternatively by dyeing the organic fibers prior to forming the non-woven mat thereof. When pigments are incorporated into the binder, the concentration of pigment is preferably kept below 5 to 10% by weight of the total sheet in order to minimize the adverse effect on the physical properties of the sheet, particularly the tensile strength, the tear strength, and abrasion resistance of the sheet.

If desired, an improved appearance of the decorative surface of the leather substitute products of this invention can be obtained by a treatment of the bound glass fiber mat just prior to plying and hot pressing that mat with the bound mat of organic fibers.

The treatment consists of applying a thin glaze coat to the surface of the bound glass fiber mat. A preferred technique for doing this is by dusting a powdered mix of the extensible polymeric binder resin and a coloring material of desired hue (in a preferred embodiment, for example, a mix of one part by weight of polyvinyl chloride and two parts by weight of burnt sienna) on to a fluid film of a plastisol of the extensible polymeric binder supported on a smooth metal surface. Ordinarily, no more of the dust is added than will stick to the fluid film if the metal surface is placed on edge and tapped. The dusted film is then heated moderately for a few minutes at a temperature just sufficient to set it and it is then applied to the bound glass fiber mat by bringing the mat and the coated surface of the metal together. The glaze coat-glass fiber-organic fiber structure is then hot pressed to consolidate it as described above.

Softness of the leather substitute materials of the invention and their ability to transpire water vapor are increased somewhat by inclusion therein of small amounts of hydrophobic substances. Such substances may be applied as sizes to the organic fibers and the glass fibers before binding such fibers with the extensible polymeric binder material. More conveniently, the hydrophobic substance is incorporated into the binder polymer composition prior to bringing together the binder with the fiber mats. Illustrative of preferred hydrophobic substances useful for the above purpose are silanes such as chlorosilane, vinyl triethoxy silane, and methyl trichlorosilane; polysiloxanes such as methylethyl polysioloxane, methyl polysiloxane, and silicones containing silanic hydrogen such as Union Carbide and Carbon Corp.'s Silicone Y–1002; and Werner or chrome complexes such as described in U.S. Patent 2,273,040 in which the acido group coordinated with a trivalent chromium atom has more than 8 carbon atoms.

Flex life of the leather substitute sheet materials of the invention is somewhat increased at the expense of a decrease in the scuff-resistance as the thickness of the glass fiber-containing surface stratum is reduced. A convenient way for arriving at any desirable balance of the flex life and scuff-resistance properties involves interposing between a thin glass fiber surface ply and the organic fiber base stratum a layer of a bound non-woven fibrous mat in which the fibers consist essentially of a mixture of glass fibers and organic fibers of not more than about ½ inch length. The glass and organic fibers in the intermediate layer are proportioned as required to give the desired properties.

The sheet material of this invention is suitable for those uses in which leather is commonly used, for example, upholstery, luggage, handbags, gloves, and the like, and is particularly suitable because of its tensile strength, scuff-resistance, and breathability or permeability to water vapor and air, in making shoe uppers. The material of this invention has a much greater resistance to scuffing than does leather ordinarily used in making shoe uppers. Shoes made from the material of this invention retain their shine for a long period of time, they generally stay cleaner than do leather shoes, they are easier to clean, and they do not tend to darken as does leather at points of abrasion and flex.

In order that the invention may be better understood, the following examples illustrating sheet materials of the invention, their preparation and properties, are given in addition to the examples already given above. Parts and percentages are by weight unless otherwise specified.

*Example 1*

This example illustrates a leather substitute product of the invention made using a base stratum which is a non-woven mat of nylon (polyhexamethylene adipamide) fibers bound with plasticized polyvinyl chloride, a surface stratum consisting of a mat of glass fibers bound with plasticized polyvinyl chloride and a thin glaze coat on the outer surface of the surface stratum consisting predominantly of polyvinyl chloride. The parts referred to in the example indicate the quantities of the various materials used per 18 inch by 18 inch square of compacted sheet material produced.

Brown dyed nylon fiber, 3 denier and 2.5 inches long and sized with vinyl triethoxysilane in amount corresponding to 7% by weight of the fiber, was used to make a non-woven nylon mat. The non-woven nylon mat was prepared by carding the nylon fibers to give a web. The web was sprayed with a plastisol having the following composition:

|   | Percent |
|---|---|
| Polyvinyl chloride ("Geon" 121, a B. F. Goodrich Co. product) | 51.5 |
| Dioctyl phthalate (plasticizer) | 32.5 |
| Dioctyl sebacate (plasticizer) | 13.9 |
| Stabilizer for polyvinyl chloride plastisol ("Barca" 10—Deecy Products Co.) | 2.1 |

The sprayed nylon web was crosslapped to give four plies of the web, each ply being laid down at a 90° angle to the ply beneath it. The resulting plied structure contained 57 parts of nylon fiber and 44 parts of the plastisol.

The mat of glass fiber for the surface stratum was prepared by dispersing in water Pyrex "glass wool" of about 8 micron diameter which had been chopped into fiber lengths of ⅜ inch or less, and then filtering the glass rapidly on to a 325 mesh screen. The dry glass mat was sprayed with the polyvinyl chloride plastisol composition tabulated above in this example. 31.5 parts of the polyvinyl chloride plastisol and 27.7 parts of glass fiber were used.

The plastisol treated glass fiber mat was placed on top of the plastisol treated nylon mat, prepared as described heretofore, and a glaze coat was applied to the surface of the glass fiber mat. This was done by first spreading 17 parts of the polyvinyl chloride plastisol composition, described above in this example, as a film on to the contact side of a press plate to be used in compacting the plied structure and then dusting on to the film a mixture of 5.4 parts of burnt sienna and 3.6 parts of powdered polyvinyl chloride. The dusted film after curing for two minutes at about 100° C, was then brought into contact with the top surface of the glass fiber mat which was in turn resting on the sprayed nylon fibers of the base mat, and immediately thereafter, the structure was hot pressed for five minutes at a temperature of 185° C. and a pressure of about 1000 pounds per square inch.

After cooling, the resulting compacted unitary structure was stretched first in one direction to about 27% more than its original length in that direction, and then released; and then it was stretched in the direction perpendicular to the first stretching direction to elongate it to about 27% more than its original length in that direction, and then released.

The sheet material of this invention had an overall thickness of about 33 mils of which the base stratum of bound non-woven nylon fibers accounted for about 27 mils. A numerical measure of the breathability of the product was obtained by measuring its water vapor permeability to obtain a so-called leather permeability value, or LPV, according to the test described by Kanagy and Vickers in Journal of American Leather Chemists Association, 45, 211–242 (April 19, 1950).

Briefly, this test for determining LPV involves covering a small dish or cup, such as a crystallizing dish, filled with 12 mesh calcium chloride with the product to be tested and then suspending the container in an inverted position in an atmosphere of 90% relative humidity and a temperature of 23° C. The increase in weight of the calcium chloride provides a measure of the moisture vapor permeability of the substance under test. The LPV is expressed in terms of grams of water per 100 square meters of substance under test per hour. It has been determined from prior experience that an LPV of over 1500 grams of water per 100 square meters per hours is necessary for comfort in shoe uppers. The product of the present example has an LPV of 4080.

Men's dress shoes in which the uppers were made of the sheet material of this invention showed satisfactory performance after 700 hours of wear. No flex cracks developed and no general abrasion or scuffing was apparent. There was no evidence of perspiration stains on the inside or outside of the shoes. The rolled edge around the ankle hole showed no signs of wear. The wearer reported the shoes as comfortable as leather shoes and commented favorably on their appearance, their ability to polish readily, their resistance to dirt, their shine and shape retention, and their scuff-resistance.

*Example 2*

This example illustrates a leather substitute sheet material in which a portion of the surface stratum is modified to include organic fibers as well as glass fibers. More specifically, the surface stratum is a 3-ply structure in which the bottom and the intermediate ply are made from a mixture of about 20% nylon fibers and 80% glass fibers, and in the top ply the fibers are solely glass. Both the nylon and the glass fibers used in the surface stratum are cut to lengths of not more than ¼ inch and the several non-woven fiber mats are made by the waterleaf process as described in Example 1 for the preparation of the glass mat.

The non-woven fiber mat or the base stratum was made of nylon fibers of the same kind and dimension as those described in Example 1 except that the fibers were not presized. The binder composition used also differed from that of Example 1 by including a silicone oil (Silicone Y-1002, Union Carbide and Carbon Corp.) in amount equal to 10% of the weight of nylon fibers, and a variety of plasticizing agents.

The methods used for forming the mats, impregnating them, and applying the glaze coat to the surface stratum, were the same as those described in detail in Example 1. Details follow showing specific materials used and quantities, the quantities being those required to form a compacted structure 18 inches square:

The polyvinyl chloride binder plastisol:

| | Percent |
|---|---|
| Polyvinyl chloride ("Geon" 121) | 42.7 |
| Dioctyl phthalate (plasticizer) | 19.2 |
| Dioctyl sebacate (plasticizer) | 4.0 |
| Dioctyl azelate (plasticizer) | 5.6 |
| Butadiene/acrylonitrile copolymer ("Hycar" 1312, a B. F. Goodrich Co. product) | 5.6 |
| Epoxidized soy bean oil ("Paraplex" G-62, a Rohm and Haas product) | 5.6 |
| Polypropylene sebacate ("Paraplex" G-25, a Rohm and Haas product) | 5.6 |
| Silicone Y-1002 | 10.0 |
| Stabilizer for polyvinyl chloride plastisol ("Barca" #10, a Deecy Products Co. product) | 1.7 |

Following is a tabulation showing parts of the various ingredients used in making the product of this example:

| | Polyvinyl chloride plastisol | Nylon Fiber | Glass Fiber | Polyvinyl chloride Powder | Burnt sienna |
|---|---|---|---|---|---|
| Base stratum | 84.4 | 84.4 | | | |
| Surface stratum: | | | | | |
| Top ply | 7.6 | | 5.7 | | |
| Middle ply | 6.2 | 1.0 | 4.2 | | |
| Bottom ply | 6.2 | 1.0 | 4.2 | | |
| Glaze coat | 4.4 | | | 3.0 | 3.0 |

The bound mats were consolidated into a unitary structure by hot pressing at a pressure of about 1235 pounds per square inch and a temperature of 185° C. for five minutes.

The product of this example had an LPV of 2890. Shoes made using the product of this example for the uppers were worn for 700 hours and throughout that period were found to be comfortable and to resist scuffing better than leather shoes.

The favorable properties of strength and elasticity combined with lightness for the product of this example, as compared with a common shoe leather, are shown by the following data:

| Property | Leather Substitute | Kip Leather |
|---|---|---|
| Tensile strength, pounds per square inch | 4,428 | 3,050 median. 1,900 transverse. |
| Stitch tear, pounds per mil | 1.3 | 0.54. |
| Elongation, Percent | 94 | 55.9 median. 62.8 transverse. |
| Unit Weight, grams per square meter | 760 | 1,194. |
| Thickness | 35 | 69.6. |

*Example 3*

In a similar manner to that described hereinbefore, a mat of glass fibers was prepared from Pyrex "glass wool." The glass wool was chopped into lengths of ⅜ inch and was approximately 0.0005 inch in diameter. These were formed into a 16" x 16" sheet comprising 14.3 parts and the sheet was sprayed with 0.4 part of a solution of polyvinyl chloride in an organic solvent. The mat was then sprayed with 16.8 parts of a polyvinyl chloride plastisol consisting of equal parts of a polyvinyl chloride ("Geon" 121, a B. F. Goodrich Co. product) and di(2-ethylhexyl) phthalate.

A base mat of binder impregnated structural fibers was prepared by carding four 16" x 16" plies of staple polyhexamethylene adipamide (nylon) fibers, 3.0 denier and 1½ inch in length, totalling 38.7 parts. The four webs were sprayed with 29.8 parts of the aforesaid plastisol and were then crosslapped on top of each other at an angle of 90° to give additional two directional strength. The ratio of binder to fiber in the base mat was 43:57.

The glass fiber mat was then placed on top of the nylon-polyvinyl chloride base and the composite was consolidated at 185° C. under a pressure of about 970 pounds per square inch for five minutes. The composite was then stretched 25% in both directions.

Example 4

This example illustrates a leather substitute sheet material in which a portion of the surface stratum is modified. More specifically, the surface stratum is a 3-ply structure in which the top ply is a bound mat of 8 micron diameter glass fibers chopped to lengths of not more than about ¼ inch, the intermediate ply is a bound mat of nylon fibers of the kind used in the base stratum and the bottom ply of the surface stratum is a bound mat made of relatively long glass fibers, specifically about 15 micron diameter and about six or more inches long.

The methods used for forming the mats, impregnating them, and applying the glaze coat to the surface stratum were the same as those described in detail in Example 1 except that a small quantity of a mixture of powdered polyvinyl chloride and burnt sienna was dusted on to each ply of the surface stratum after the fiber mat composing such ply had been sprayed with plastisol.

Details follow showing specific materials used and quantities thereof, the quantities being those required in form a compacted sheet 18 inches square.

The polyvinyl chloride binder plastisol used in binding the fiber mat of the base stratum was:

|  | Percent |
|---|---|
| Polyvinyl chloride ("Geon" 121) | 39.0 |
| Dioctyl phthalate (plasticizer) | 19.4 |
| Dioctyl sebacate (plasticizer) | 4.1 |
| Dioctyl azelate (plasticizer) | 5.6 |
| Butadiene/acrylonitrile copolymer ("Hycar" 1312, a B. F. Goodrich Co. product) | 5.6 |
| Epoxidized soy bean oil ("Paraplex" G-62, a Rohm and Haas product) | 5.6 |
| Polypropylene sebacate ("Paraplex" G-25, a Rohm and Haas product) | 5.6 |
| Silicone Y-1002 | 13.3 |
| Stabilizer for polyvinyl chloride plastisol ("Barca" #10, a Deecy Products product) | 1.8 |

The plastisol used to bind the nylon fiber mat which constituted the intermediate ply in the 3-ply surface stratum was the same as that tabulated above. The plastisol used in the top and bottom plies of the surface stratum differed only by having the above plastisol modified by addition of 1%, based on the weight of the plastisol, of a dark brown acetamine dye in order to give a visual aid in spraying the mats. For use in forming the glaze coat, 5% of dark brown acetamine dye was added to the above plastisol.

Following is a tabulation showing parts of the various ingredients used in making the product of this example:

|  | Polyvinyl chloride plastisol | Nylon Fiber | Glass Fiber | Polyvinyl chloride Powder | Burnt sienna |
|---|---|---|---|---|---|
| Base stratum | 84.4 | 84.4 |  |  |  |
| Surface stratum: |  |  |  |  |  |
| Top ply | 8.3 |  | 6.3 | 1.9 | 0.6 |
| Middle ply | 3.0 | 2.0 |  | 1.1 | 0.4 |
| Bottom ply | 4.3 |  | 3.3 | 1.1 | 0.4 |
| Glaze coat | 4.4 |  |  | 4.4 | 1.5 |

The plastisol bound mats were consolidated into a unitary structure by hot pressing at a pressure of about 1235 pounds per square inch and at a temperature of 185° C. for five minutes.

The product of this example was found to have the following desirable properties:

| Leather permeability value (LPV), grams H$_2$O/100 sq. meters/hr | 4350 |
|---|---|
| Tensile strength, lbs./sq. in | 5562 |
| Stitch tear | 1.55 |
| Elongation, percent | 94 |
| Thickness, mils: |  |
| Total | 40 |
| Base stratum | 34 |
| Surface stratum | 6 |
| Weight in grams/sq. meter | 890 |

Shoes made from the product of this example showed generally the same desirable properties as those made from the product of Example 1.

I claim:

1. A water vapor permeable, scuff-resistant, flexible leather-substitute sheet material comprising a base stratum containing predominantly a mat of non-woven organic fibers bound together by an extensible polymeric binder and a surface stratum of non-woven glass fibers bound together by an extensible polymeric binder, said sheet having a network of pores substantially contiguous with fibers throughout the thickness of the sheet.

2. A product of claim 1 in which the extensible polymeric binder is a vinyl polymer and the organic fibers are composed of a linear condensation polymer.

3. A product of claim 2 in which the vinyl polymer is polyvinyl chloride and the linear condensation polymer is nylon.

4. A water vapor permeable, scuff-resistant, flexible leather substitute sheet material comprising a base stratum, from about 20 to 70 mils thick, containing predominantly a mat of non-woven nylon fibers of ½ to 3 inches in length and from 0.5 to 6 denier bound together with from 40% to 225%, based on the weight of the nylon fiber, of polyvinyl chloride, and a surface stratum, from 1/20 to 1/3 the thickness of the base stratum, of a mat of non-woven glass fibers of up to about ½ inch in length bound together with from 100% to 200%, based on the weight of the glass fiber, of polyvinyl chloride, said sheet having a network of pores substantially contiguous with fibers throughout th thickness of the sheet.

References Cited in the file of this patent

UNITED STATES PATENTS

| 2,306,781 | Francis | Dec. 29, 1942 |
|---|---|---|
| 2,689,199 | Pesce | Sept. 14, 1954 |
| 2,757,100 | Simril | July 31, 1956 |
| 2,826,265 | DeWoody | Mar. 11, 1958 |